Dec. 29, 1953  F. W. SMITH  2,664,000
REFRIGERATING APPARATUS FOR TRANSPORTATION DEVICES
Filed Jan. 18, 1951  3 Sheets-Sheet 1

INVENTOR.
Frank W. Smith
BY Frederick F. Mason
Atty

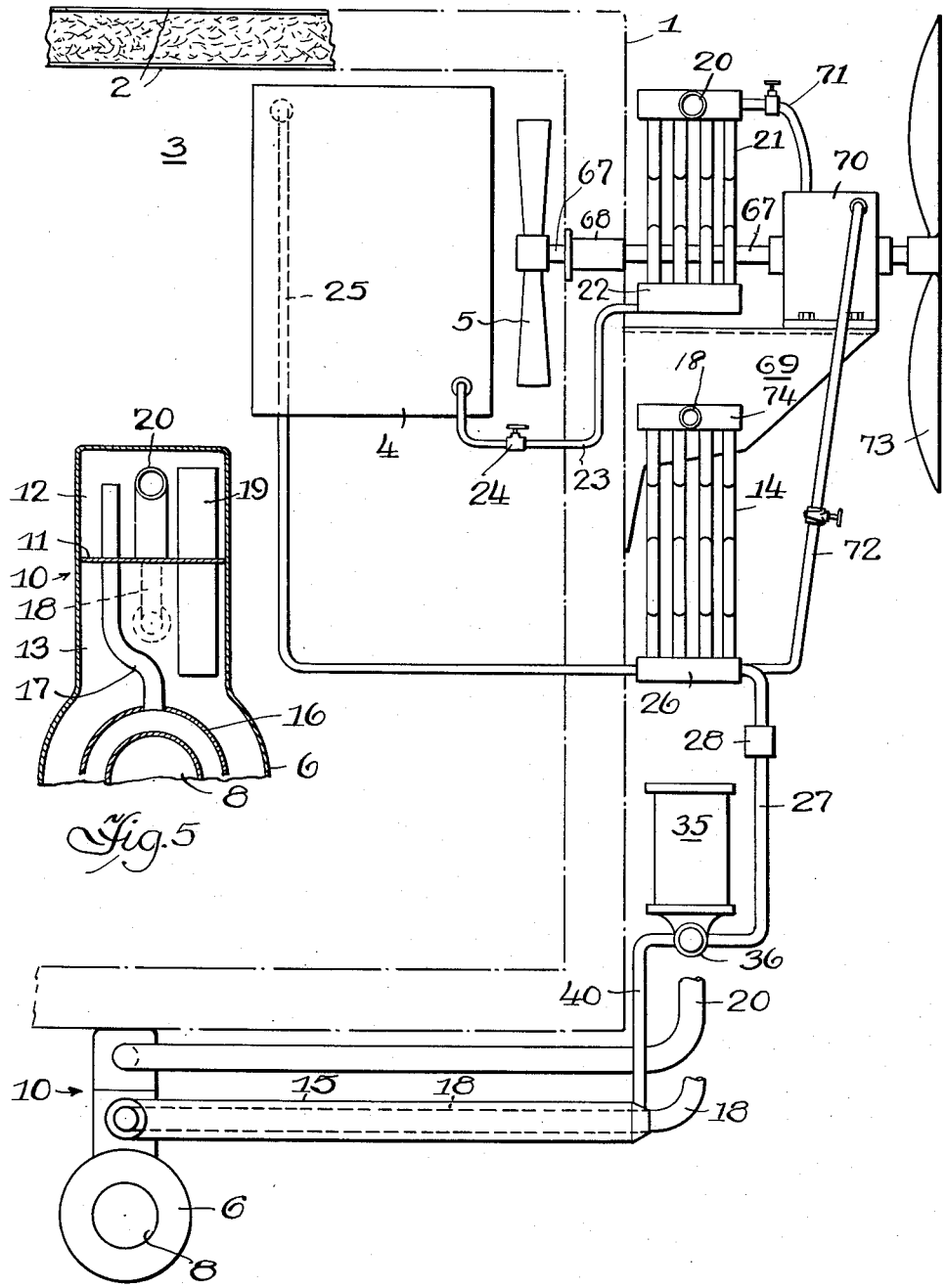

Dec. 29, 1953 — F. W. SMITH — 2,664,000
REFRIGERATING APPARATUS FOR TRANSPORTATION DEVICES
Filed Jan. 18, 1951 — 3 Sheets-Sheet 3
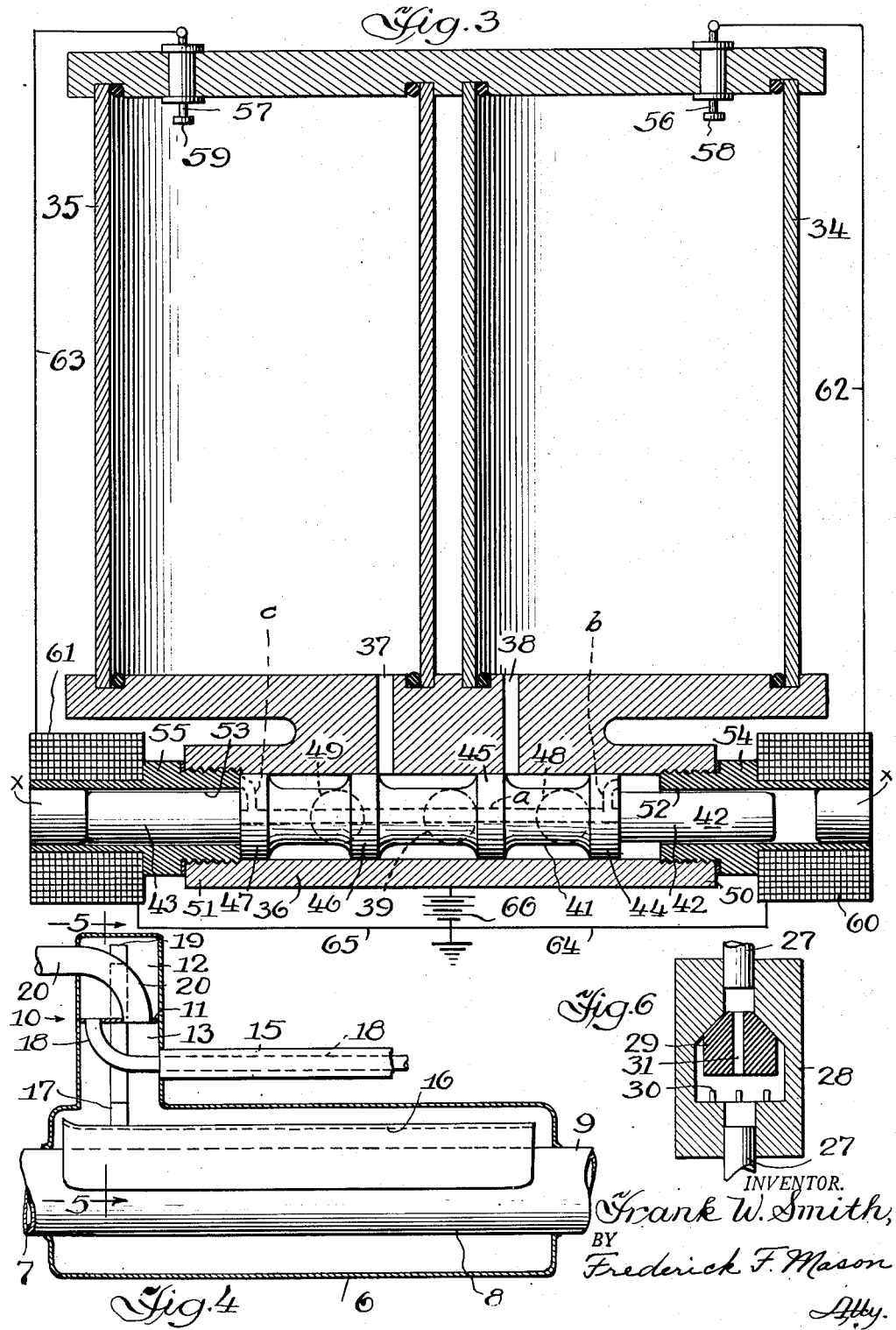

Patented Dec. 29, 1953

2,664,000

UNITED STATES PATENT OFFICE 2,664,000

REFRIGERATING APPARATUS FOR TRANSPORTATION DEVICES

Frank W. Smith, Chicago, Ill.

Application January 18, 1951, Serial No. 206,625

9 Claims. (Cl. 62—119)

This invention relates to refrigerating apparatus for transportation devices, and more particularly to apparatus for adapting absorption refrigerators to automobile trailers, railway cars, and other movable transportation devices, which will for brevity be hereinafter referred to as trailers. An absorption type refrigerator includes a generator in which the refrigerant gas is driven out of solution by the application of heat, a condenser in which the refrigerant is cooled below the condensing temperature corresponding to the pressure in the generator, a receiver for the refrigerant thus liquified, a control for reducing the pressure to correspond to refrigerating temperatures, an evaporator in which the refrigerant expands and evaporates absorbing heat from the refrigerated space sufficient to provide the latent heat of vaporization for the refrigerant.

The expanded gas from the evaporator then must be reabsorbed into the weak liquor left from when the gas was driven out of it. This is accomplished in an absorber where the weak liquor, admitted through a reduced orifice to reduce the pressure thereof, trickles from the top to the bottom of the coils while the expanded gas rises from the bottom in contact with the liquor and is absorbed with the evolution of heat which must be radiated from the coils. The strong liquor thus formed in the absorber, which is under relatively low pressure, must be returned to the generator which is under considerably higher pressure. I have provided special means for this purpose.

The evaporator inside the refrigerated space must be provided with forced draft to circulate the air over and around the cooling coils and throughout the space being refrigerated. For this purpose a power driven fan is required, which is disclosed in the following specification as positively driven in a novel manner, both when the trailer is in motion and when it is stationary. The condenser and absorber coils are located on the outside of the front of the trailer to be air-cooled by the motion of the trailer when the trailer is in motion.

However, a further important need is that these trailers be precooled before loading, and that their contents be also maintained cool when the trailers are stationary. This requires forced draft, not only for the evaporator inside, but also for the condenser and absorber coils outside, while the trailer is standing at the loading dock. In this position, various kinds of power are available, or can readily be made available, at the loading dock, for use in the present invention.

For this purpose I have mounted a propeller fan of conventional design ahead of the evaporator for blowing air currents over and around the evaporator coils and toward the rear of the space being refrigerated. This fan will be mounted on a horizontal, centrally located shaft which will extend forwardly through the insulated forward wall of the trailer, and beyond and clear of the condenser and absorber coils on the outside of said trailer front wall. Here this shaft will pass through, and be fixed to, the rotor of a prime mover such as an electric motor, a gas or steam turbine, or the like, mounted on the outside of the front of the trailer. On the forward end portion of this shaft, and clear of the motor or turbine, is fixed a windmill or airplane type of air propelling fan. This fan or propeller will serve two purposes, (1) to turn the shaft and provide power for driving the evaporator fan when the trailer is in motion, and (2) when the trailer is stationary the motor or turbine will drive the shaft and the forward or outside fan or propeller will be driven and provide drafts of air for cooling the condenser and absorber coils arranged on the front of the trailer, said shaft at the same time rotating the evaporator fan inside of the trailer.

I have also provided a special arrangement of generator having a separator and analyzer especially adapted for use in the present invention, and the details of which will be later more fully described. This generator will be heated, while the truck and trailer are in motion on the highway, by the exhaust gases from the internal combustion engine of the truck, or by any other suitable and desirable source of heat. When the trailer is in a loading or unloading dock, with the truck disconnected, or its engine not running, the heat for the generator may be supplied from commercial tanks of compressed fuel gas, or from steam if available, or any other suitable source.

Among the objects of my invention are: to provide a new and improved refrigerating apparatus for the purposes referred to; to provide an absorber type refrigerating apparatus for accomplishing the advantages pointed out herein; to provide a new construction and combination of generator in an absorption type refrigerating apparatus; to provide a novel construction and arrangement of duplicate two-pressure transfer tanks, in combination with an absorption type refrigerating apparatus; and such further objects, advantages and capabilities, inherently possessed by my invention, as will later more fully appear.

My invention further resides in the combination, construction and arrangement of parts illustrated in the accompanying drawings, and while I have shown therein a preferred embodiment, I wish it understood that the same is susceptible of modification and change without departing from the spirit of my invention.

In the drawings:

Fig. 2 is a vertical section on the line 2—2 of Fig. 1.

Fig. 3 is an enlarged vertical section on a median plane through the duplicate two-pressure transfer tanks.

Fig. 4 is a longitudinal vertical section through the generator, on a slightly larger scale than shown in Fig. 1.

Fig. 5 is a vertical, transverse section, on the line 5—5 of Fig. 4.

Fig. 6 is a vertical, transverse section of the vented check-valve, and associated parts, in the pipe for feeding rich liquor from the absorber into the duplicate two-pressure transfer tanks.

Figure 1:
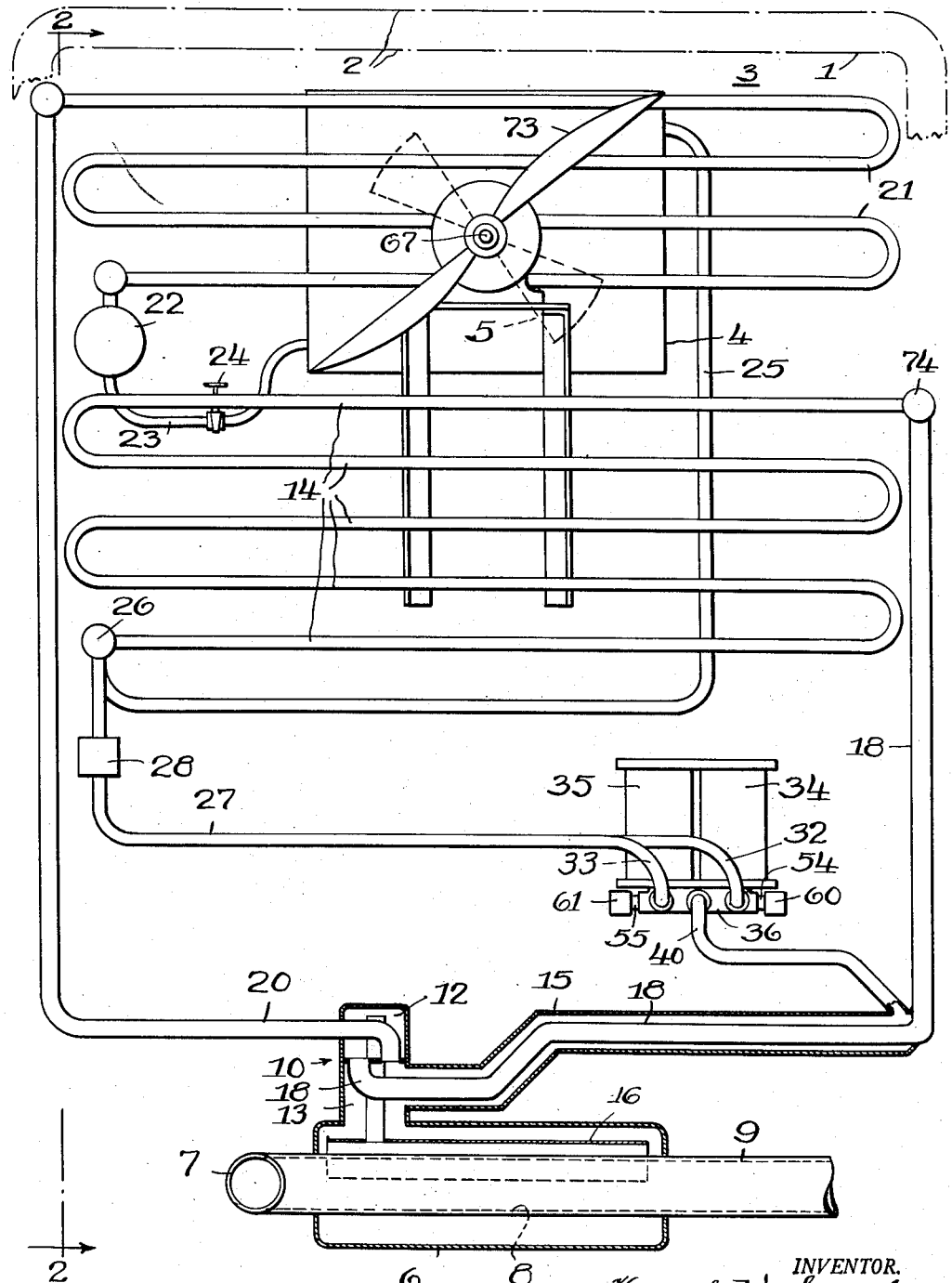
Fig. 1 is a more or less diagrammatic front elevation of a refrigerating apparatus mounted on the outside of the front of a trailer, and embodying my invention, the trailer body being only shown fragmentarily in dotted lines.

In the form of my invention shown for illustrative purposes in the drawings, the trailer 1, which is conventionally mounted upon wheels (not shown), is detachably connected in any suitable manner to the usual tractor for drawing the trailer along the highway. As will be understood the tractor and trailer may assume different forms and styles as may be desired. The trailer walls, indicated generally at 2, will be insulated in any satisfactory conventional manner to enable the interior of the trailer to be maintained in a refrigerated condition without undue transfer of heat through the walls thereof.

Secured in any satisfactory stable manner in the upper forward portion of the compartment 3 in the interior of the trailer is an evaporator unit comprising on its top, bottom and two sides, walls forming a hollow casing open at both ends. Fixedly mounted within said evaporator casing is a conventional fin-tube forced draft evaporator, not shown in detail, having any desired number of intercommunicating coils of any desired length, and formed of light steel, aluminum, or any other suitable material.

In the evaporator the tubes of the coils therein extend preferably horizontally and laterally back and forth in the hollow evaporator casing, except where interconnected at their ends by return elbows or the like. This enables air currents to be passed over and around the coils from the rotatry fan 5, later more fully described, thus sucking the warmer air into the front end of the evaporator casing, and blowing the colder air out of the rear end thereof to be circulated throughout the trailer compartment. It is to be noted that the fan 5 is positioned inside of the trailer compartment and just in front of the open end of the evaporator casing.

Rigidly fixed to the lower portion of the outer surface of the front wall of the trailer, or underneath the front end of the trailer as shown in Fig. 2, is a generator 6 for liberating ammonia gas from the aqua-ammonia strong liquor therein. Generator 6 is heated by the exhaust from the tractor engine which may be an internal combustion engine, a steam engine, or any other suitable prime mover which emits hot exhaust gases or vapors. These hot exhaust gases enter the generator through the pipe 7, passing through the inner tubular passageway 8, and then out through the outlet pipe 9 to the outer air or other suitable place of disposal. It is thus apparent that this structure serves not only as a heater for the generator, but also as a muffler for the exhaust of the tractor engine.

When the trailer is stationary, as when standing in a loading or unloading dock, and when the tractor is disconnected from the trailer, or when the tractor engine is idle, the generator 6 may be heated by hot gases, air or vapors piped into the inlet pipe 7, then passing through inner passageway 8, to heat the generator 6, and then out through the outlet pipe 9. At this time the hot gases or vapors will be provided from any suitable heating device the fuel for which will be supplied from commercial tanks of compressed fuel gas. Also, if desired, the generator at such time may be heated from steam if available, or any other available, suitable source of heat, fed into and through the tubular passageway 8.

The dome 10 on the top of the generator is divided by a partition 11 into two compartments, (1) the separator 12 above, and (2) the analyzer 13 below. The analyzer space 13 is filled with strong aqua-ammonia returning from the absorber 14 through the outer pipe of the heat exchanger 15. The purpose of the analyzer is to pass the newly separated ammonia gas which may have some water vapor entrained therewith, through the strong aqua-ammonia, which has an affinity for water and a tendency therefore to "dry" the ammonia gas by absorbing the water vapor in it. This action will be enhanced by the fact that the strong liquor returning is at a much lower temperature than the newly freed gas or the water vapor entrained, and will condense the vapor.

The separation of the gas in the generator begins beneath the baffle 16 above the hottest end of the exhaust flue. The gas collects along underneath the top of this baffle and blows out and upward with a "percolator" effect through the elevator pipe 17 taking with it the weak liquor from which it is being separated, into the separator chamber 12 above. The weak liquor cascades over the upper end of the elevator tube, downward to the bottom of the separator chamber onto the partition 11, and out through the inside pipe 18 of the heat exchanger to the absorber.

The ammonia gas collects in the upper chamber of the separator dome and as the pressure increases, is forced downwardly through the downtake pipe 19 to the lower part of the analyzer chamber 13 and bubbles upwardly through the strong liquor therein, losing the entrained water vapor, after which it passes out to the rectifier pipe 20 and upwardly to the condenser 21. As the rectifier pipe is also air-cooled, any possible remaining moisture will be condensed and will drip back downwardly along the sides of the vertical rectifier pipe to the strong liquor in the analyzer chamber 13.

A suitable quantity of aqua-ammonia will be introduced into the system of the refrigerating apparatus when assembled at the factory. The connection of the other parts of the system to the condenser and the generator will now be described. The condenser 21 comprises any desired number of coils, which are securely mounted on the outer surface of the trailer front wall near the upper edge thereof, as will be understood in Fig. 2, and at its outlet end connects with the liquid ammonia receiver 22, from which extends pipe line 23 which leads to the inlet coil of the evaporator.

Mounted in pipe line 23 between the receiver 22 and the evaporator inlet is a needle valve 24 which may be preadjusted to give any desired drop in pressure to the liquid ammonia passing from receiver 22 to the evaporator. While these pressures on the two sides of the needle valve 24 may differ as desired within operative limits, they are for illustrative purposes here assumed to be from 220 to 250 pounds per square inch on the condenser side of the needle valve, and approximately 25 pounds per square inch on the evaporator side thereof. In other words the needle valve steps the pressure down to the amount desired as the ammonia passes therethrough.

As will be understood, this substantial reduction in the pressure on the liquid ammonia causes it to vaporize as it passes into and through the coils of the evaporator, thus absorbing the heat of vaporization and effecting refrigeration in the well known manner. After passing through the evaporator coils, the thus vaporized ammonia passes through the outlet pipe 25 to the mixing header 26 of the absorber 14.

Extending downwardly from the mixing head 26 is a pipe 27 having a check-valve 28 to permit a flow of strong ammoniacal liquor, which has been formed in the absorber by the absorption of ammonia gas from the evaporator by the weak liquor from the separator chamber 12 through pipe 18, freely in a direction outwardly away from the absorber, but under a vented much slower flow in the opposite direction. The movable member 29 in this check-valve is of smaller diameter than the chamber within which it moves to permit a flow of rich liquor therepast when open, and having a conical head to seat against a complemental seat when closed. When open, the movable member 29 seats against pins 30 to permit free flow therepast, and is formed with a restricted passageway 31 to permit a restricted flow therethrough when the valve is closed. This restricted passageway forms a vent to enable a slow release of the higher pressure in one or the other of the two transfer tanks, later more fully described, so as to relieve said higher pressure in the emptied transfer tank sufficiently to permit the flow of rich liquor from the absorber thereinto. This restricted vent also prevents building up an undue high pressure in the absorber.

Pipe 27 at its outlet end is connected by a pair of branch pipes 32 and 33 with the interior of a pair of duplicate two-pressure transfer tanks 34 and 35, which can be two joined tanks, or a single tank with a partition to seal one side from the other. The bottom of these unitary duplicate two-pressure transfer tanks is formed with a transversely extending cylinder 36 fixed thereto. Leading into the bore of the cylinder 36 from the left hand transfer tank 35, as viewed in Fig. 3, is a passageway or port 37, which connects the interior of tank 35 with said cylinder bore. A passageway or port 38 likewise connects the right hand transfer tank 34 with the bore in cylinder 36.

Formed in the wall of the cylinder 36 to extend laterally therethrough, midway between ports 37 and 38, is an outlet port 39 to which is connected the outlet pipe 40. Slidably mounted in the bore of cylinder 36 is a specially formed valve rod 41 having at its respective ends armature extensions 42 and 43 adapted to move into and out of solenoids, later more fully described, to operate said valve rod. Formed at suitably spaced distances along rod 41 are cylindrical enlargements or valves 44, 45, 46 and 47 of a diameter to closely but slidably fit the walls of the cylinder bore, to effect the operation of the transfer tanks. Also formed in the wall of the cylinder 36 to extend laterally therethrough, are two inlet ports 48 and 49, the former positioned a slight distance to the right of port 38, and the latter a slight distance to the left of port 37, as viewed in Fig. 3.

Screwed or otherwise detachably secured in cylinder ends 50 and 51 are tubular solenoid supporting members 54 and 55 having axial openings 52 and 53 to slidably receive the armature extensions 42 and 43. Fixed in the outer end of each of the tubular solenoid supporting members 54 and 55 is a short magnet core $x$ which is liquid tight to prevent leakage of a liquid therepast from the cylinder bore. Extending downwardly through the respective upper ends of transfer tanks 34 and 35 are a pair of rigid conductors 56 and 57, each insulated from its tank end, and having on their lower ends contacts 58 and 59 respectively. Mounted on solenoid supports 54 and 55 are solenoid coils 60 and 61 respectively. Connecting conductors 56 and 57 with solenoid coils 60 and 61 respectively are wires 62 and 63. The solenoid coils are connected at their opposite ends by wires 64 and 65 to the battery 66 which is connected to the base of the tanks and is grounded.

It will be noted that when valve rod 41 is in the position shown in Fig. 3, the port 37, through the space between the cylindrical enlargements 45 and 46, is in communication with the outlet port 39 to permit rich liquor under high pressure to flow from transfer tank 35 through outlet pipe 40 and through the annular space in heat exchanger 15 along the outside of pipe 18, and into the analyzer chamber 13 of the generator. This flow will be by gravity because the pressure in transfer tank 35 has been equalized with that of the generator. At the same time the port 38 of transfer tank 34 is in communication with inlet port 48 and the branch 32 of pipe 27, see Fig. 1, to permit flow of rich liquor under low pressure from the absorber into transfer tank 34 through the space between the cylindrical enlargements 44 and 45. As the level of the rich liquor thus entering transfer tank 34 rises, it finally comes into contact with contact 58 and closes the circuit to, and energizes, solenoid coil 60, which draws armature extension 42 into this coil and moves valve rod 41 to the right as viewed in Fig. 3, until the right hand end of enlargement 44 abuts the inner end of solenoid supporting member 54, and is stopped thereby. Passageways $a$, $b$ and $c$ in valve rod 41 permits movement of liquid from one end to the other thereof during operation. As the other solenoid coil 61 is at this time deenergized because of the liquid level of the rich liquor in tank 35 being below contact 59, this means that the valve rod 51 will remain in this position until the solenoid coil 61 is again energized to draw it to the left.

With the valve rod 41 now assumed to be moved to the right, in Fig. 3, as described above, the cylindrical enlargement 46 will stand to the right of tank port 37, and cylindrical enlargement 45 will stand to the right of tank port 38. This means that tank 34, which was filled under low pressure from the absorber, will now be emptied under high pressure into the generator through port 38, the space between enlargements 45 and 46, outlet port 39, pipe 40, and the outside space of heat exchanger 15. While tank 34 was emptying, tank 35 was filling until its liquid level touches contact 59 and causes solenoid 61 to become energized and draw valve rod 41 to the left in Fig. 3. It is thus seen that while one transfer tank is filling under low absorber pressure, the other is emptying into the generator under high pressure. Each time the valve rod 41 is shifted, the tank that has just emptied will be cut off from communication with the generator and its high pressure, and the high pressure ammonia gas that then remained in the just emptied tank will be vented through the vent opening 31 in the check-valve member 29 into the absorber to be absorbed therein. This excess pressure is quickly dissipated into the absorber and the filling of the tank in question then proceeds until its liquid level touches one or the other of the contacts 58 or 59 to again shift the valve rod and start another cycle. It is pointed out that while one tank is filling, the other is prevented from filling because of obstruction from one or the other of the cylindrical enlargements or valves 45 or 46.

As will be understood, the cooler rich liquor passing from a transfer tank to the generator will have heat added to it in the heat exchanger 15 by the hot weak liquor in pipe 18.

Evaporator fan 5 is mounted on, and fixed to rotate with, a horizontal shaft 67, rotatably journaled in a bearing 68 fixedly mounted in the front wall of the trailer. Also fixed to the outer face of the front wall of the trailer is a bracket 69 upon the upper surface of which is bolted or otherwise secured a motor 70 for driving the shaft 67 when the trailer is stationary at a loading or unloading dock. Motor 70 may be of any suitable type, such as an electric motor to be plugged into any available source of electricity at said dock, or a gas or steam turbine to be operated from any suitable source of gas or steam, including, if desired, high pressure ammonia gas passing through pipe 71 leading from the inlet to the condenser, prior to being condensed, to the motor, and from the motor through pipe 72 to the mixing head 26 of the absorber.

Shaft 67 extends forwardly a short distance from motor 70, there being fixed on this forwardly extending portion, to rotate therewith, a fan 73 of the windmill, airplane, or other suitable type, with its blades so arranged as to force currents of air rearwardly against the condenser and absorber when the trailer is stationary and this fan is rotated by the motor. As will be understood, rotation of outside fan 73 and shaft 67 will also rotate the evaporator fan 5, both when the trailer is stationary and when it is in motion along the highway. When the trailer is in motion along the highway, motor 70 will not be needed as a driving power for shaft 67, as the ambient air currents from the moving trailer will rotate the outside fan 73 and shaft 67, which in turn will rotate the evaporator fan. These outside air currents, when the trailer is in motion, will also strike and cool the condenser, absorber, liquid ammonia receiver tank, and other exteriorly located parts that are desired to be cooled.

From the above it will be understood that the hot exhaust gases from the tractor engine, or heating medium from any other suitable source, will enter space 8 through inlet pipe 7, thus filling said space and heating the rich liquor in the generator 6, and cause bubbles of ammonia gas to be formed which will pass up through the elevator pipe 17, carrying some slugs of liquid up with the bubbles. The ammonia gas thus liberated from the top of the elevator pipe 17 will fill the separator chamber 12, and then pass downwardly through down-take pipe 19 and into the rich liquor in analyzer chamber 13 through which it will bubble upwardly, losing its entrained water vapor, and then passing out through the rectifier pipe 20 to the condenser 21. In the condenser this ammonia gas under pressure will be cooled and condensed by the air currents passing rapidly thereover when the trailer is in motion on the highway, and by the back wash of air from the outside fan 73 when the trailer is stationary. Any liquid carried up through the elevator pipe 17, from which a portion of ammonia gas has been driven and which is now weak liquor, will fall onto the partition 11 and pass out through pipe 18 to the upper header 74 of the absorber, after having passed through the heat exchanger 15.

The ammonia gas liquified in the condenser passes into the liquid ammonia receiver 22. The pressures in the generator, pipe 20, condenser 21, receiver 22, and pipes 18 and 46, will be high, for example in the neighborhood of from 220 to 250 pounds per square inch. Shortly after leaving the receiver tank 22, the high pressure liquid ammonia passes through the needle valve 24 which reduces its pressure to approximately 25 pounds per square inch. This pressure-reduced liquid ammonia then passes into the evaporator where it evaporates and refrigeration is effected. This cooled air surrounding the evaporator is circulated throughout the trailer compartment by fan 5. From the evaporator the ammonia vapor passes to the absorber where it is absorbed in the weak liquor from pipe 18, thus forming a rich liquor. The high pressure weak liquor in pipe 18 is reduced to about 25 pounds per square inch as it enters the absorber, by passing through a restricted opening where it enters the upper absorber head, thus transforming it into a jet or spray.

From the absorber this rich liquor, which is now under approximately 25 pounds per square inch, passes first into one of the transfer tanks 34—35 under low pressure, and then into the other under low pressure. As explained earlier herein, as soon as either of these transfer tanks is approximately full its liquid level by touching contact 58 or 59 causes a current of electricity to energize its respective solenoid and open the port 37 or 38 of that particular tank, which immediately puts that tank under high pressure from outlet port 39 and pipe 40 communicating with the generator. This equalization of pressure in the last mentioned tank with the pressure in the generator, permits the rich liquor to flow by gravity into the generator until that tank is emptied and the other tank is filled and its solenoid energized to shift the valve rod in the opposite direction and enable emptying of the newly filled tank in the manner stated.

This enables the filling of one tank with rich liquor from the absorber under low pressure, and the emptying of the other tank under high pressure, alternately. In other words, it enables the passing of low pressure rich liquor from the absorber into the high pressure generator. The temperature of the cooler rich liquor being fed by gravity from one or the other of the transfer tanks to the generator, is increased when it passes through the heat exchanger 15 by the higher temperature of the hot weak liquor passing through pipe 18. The rich liquor passing from the transfer tanks into the generator maintains an operative amount of rich liquor in the generator at all times for carrying on continuous operation of the refrigeration system.

The combination of the motor 70 and the outside fan or propeller 73, both mounted on shaft 67 and located outside of the front wall of the trailer, and the fan 5 also mounted on shaft 68 inside of the trailer compartment in front of the evaporator, is an important feature of my invention. This combination enables the air currents generated by the movement of the trailer along the highway, to rotate the outside air propeller, which in turn rotates the shaft 67 and the fan 5; and the heating of the generator by the truck engine exhaust when the trailer is in motion.

When the trailer is stationary, motor 70 rotates shaft 67, the outside propeller 73, and the inner fan 5, while the operation of the refrigerating system continues. This rotation of the outside propeller 73 when the trailer is stationary, sets up strong currents of air which blow over and around the condenser, the liquid ammonia receiver, the absorber, and associated parts, all located outside of the trailer. As stated, other forms of motors may be used for the motor 70 if desired. In order to provide an increased air blast striking the condenser, absorber, and other parts outside of the front of the trailer, to be cooled when the trailer is stationary and propeller 73 is being driven by motor 70, the blades of propeller 73 may be arranged to have adjustable pitch to automatically provide such increased air blast at this time.

It is thus seen that I have provided a novel refrigerating apparatus that may be used for cooling trailers, railway cars, and the like, both when in motion and when stationary, having improved means for transferring low pressure absorber rich liquor into a high pressure generator, and improved means for handling the refrigerant in the generator and other parts of the system.

Having now described my invention, I claim:

1. Refrigerating apparatus of the absorption type for cooling closed transportation devices both when in motion and when stationary, comprising, an evaporator within the device, a fan rotatably mounted in the device for blowing air over the evaporator, an air propeller rotatably mounted in the open air outside of the closed portion of the device in front thereof, means connecting the propeller with the fan for rotating the latter from the former by air currents created by movement of the transportation device, an absorber mounted on the outside of the device in the open air in front thereof and behind said propeller to receive cooling air therefrom, and means for rotating the propeller and fan when the device is stationary, said last mentioned means being inoperative to rotate the propeller when the device is in motion.

2. Refrigerating apparatus of the absorption type for cooling the closed hollow interior of transportation devices, comprising in combination, an evaporator in said interior, a fan in said interior in front of the evaporator for forcing air over the evaporator, a condenser, absorber and generator mounted in the open air on the outside of the front of said transportation device and operatively connected with the evaporator, an air propeller rotatably mounted on the outside of the transportation device in the open air at a greater forward distance than the condenser and absorber, connections between the air propeller and fan for driving the latter from the former when the propeller is rotated by air currents created by the motion of the transportation device, and a motor for rotating the propeller and fan when the transportation device is stationary, said propeller at this time forcing cooling air currents against said condenser and absorber.

3. Apparatus as claimed in claim 2, including two-pressure alternating transfer tanks connected by pipes between the absorber and the generator for enabling low pressure refrigerant from the absorber to be passed into the high pressure interior of the generator, the absorber being separate from the transfer tanks except for said pipe connections.

4. Refrigerating apparatus of the absorption type for cooling the freight-holding compartment of a truck trailer and the like, comprising in combination, an evaporator and a fan in said compartment, a generator, condenser, absorber, and a separate transfer tank, outside of said compartment in the open air and operatively connected in the refrigerating system of the apparatus, an air propeller on the outside of the compartment and in front thereof, a rotatable shaft on which the fan and propeller are fixed to rotate therewith, a motor on said shaft for rotating it, connections between the motor and the refrigerating system for driving the motor by refrigerant gas from the system and returning the gas into the system, said shaft being rotated by the air propeller when the trailer is in motion, and by the motor when the trailer is stationary.

5. Apparatus as claimed in claim 4, in which the transfer tank has two sections mounted on a common base, each section alternately holding low pressure liquid and high pressure liquid, means in said common base for introducing low pressure liquid from the absorber to either of said sections, and means in said common base for introducing high pressure liquid from either of said sections into the generator while the other section is receiving low pressure liquid.

6. Refrigerating apparatus of the absorption type, comprising, a generator, a condenser, an evaporator, and an absorber all connected in series, the connection between the absorber and the generator including a pipe line having incorporated therein a pair of duplicate two-pressure transfer tanks and a check-valve between the tanks and the absorber, said tanks having in their lower ends a cylinder formed with a longitudinal bore, a valve rod having a plurality of valves thereon, each of said tanks having a port leading to said bore, a pair of inlet ports in said cylinder leading from the absorber to the cylinder bore, and means for automatically alternately shifting the valve rod to fill one tank from the absorber while the other tank is emptying to the generator.

7. Refrigerating apparatus as claimed in claim 6, in which said check-valve is formed with a vent to reduce the generator pressure in the emptied tank to absorber pressure to enable gravity filling of the emptied tank with rich liquor from the absorber.

8. Refrigerating apparatus as claimed in claim 7, in which said automatic means includes a solenoid for shifting said valve rod to alternately fill one tank while the other is emptying.

9. Refrigerating apparatus for cooling the freight-holding compartment of a truck trailer and the like, comprising in combination, an evaporator in said compartment, a high pressure generator, a condenser and a low pressure absorber outside of the compartment in the open air and operatively connected with the evaporator, duplicate two-pressure transfer tanks connected with the absorber and the generator for transferring liquid refrigerant from the low pressure absorber to the high pressure generator, said tanks having a common base formed with a cylinder, and said tanks having ports leading into the cylinder of said common base, and an alternating valve member in the base of said duplicate two-pressure transfer tanks, movable in the cylinder laterally of the tanks in one direction to enable low pressure liquid to fill one tank and high pressure liquid to empty from the other, and movable in the cylinder laterally of the tanks in the opposite direction to empty the filled tank and to fill the empty tank.

FRANK W. SMITH.

References Cited in the file of this patent

UNITED STATES PATENTS

| Number | Name | Date |
|---|---|---|
| 1,874,654 | Taylor | Aug. 30, 1932 |
| 1,973,116 | Shutts | Sept. 11, 1934 |
| 2,118,739 | Schulman | May 24, 1938 |
| 2,203,406 | Dempsey, Jr. | June 4, 1940 |
| 2,257,986 | Soroka | Oct. 7, 1941 |
| 2,263,476 | Sunday | Nov. 18, 1941 |
| 2,298,029 | Blomquist | Oct. 6, 1942 |
| 2,394,109 | Sanchez | Feb. 5, 1946 |